(12) United States Patent
Uno

(10) Patent No.: US 10,179,527 B2
(45) Date of Patent: Jan. 15, 2019

(54) SUPPORT DEVICE FOR VEHICLE SEAT

(71) Applicant: TOYOTA BOSHOKU KABUSHIKI KAISHA, Aichi-ken (JP)

(72) Inventor: Yosuke Uno, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 301 days.

(21) Appl. No.: 15/160,692

(22) Filed: May 20, 2016

(65) Prior Publication Data

US 2016/0347222 A1 Dec. 1, 2016

(30) Foreign Application Priority Data

May 26, 2015 (JP) ................................. 2015-106621

(51) Int. Cl.
- *B60N 2/66* (2006.01)
- *B60N 2/64* (2006.01)
- *B60N 2/90* (2018.01)

(52) U.S. Cl.
CPC ............ *B60N 2/665* (2015.04); *B60N 2/643* (2013.01); *B60N 2/646* (2013.01); *B60N 2/90* (2018.02)

(58) Field of Classification Search
CPC ........ B60N 2/914; B60N 2/665; B60N 2/646; B60N 2/643
USPC ........................................... 297/284.6, 284.3
See application file for complete search history.

(56) References Cited

U.S. PATENT DOCUMENTS

| | | | |
|---|---|---|---|
| 4,391,466 A * | 7/1983 | Smith | A47C 4/54 297/452.41 |
| 4,690,456 A | 9/1987 | Chiba et al. | |
| 4,699,424 A | 10/1987 | Andres et al. | |
| 5,772,281 A * | 6/1998 | Massara | B60N 2/643 297/284.4 |
| 5,860,699 A | 1/1999 | Weeks | |

(Continued)

FOREIGN PATENT DOCUMENTS

| CN | 101355894 A | 1/2009 |
|---|---|---|
| CN | 202448791 U | 9/2012 |

(Continued)

OTHER PUBLICATIONS

Chinese Office Action for counterpart CN App. No. CN201610349032.1 dated Jan. 19, 2018, along with partial English-language translation thereof.

(Continued)

*Primary Examiner* — Milton Nelson, Jr.
(74) *Attorney, Agent, or Firm* — Greenblum & Bernstein, P.L.C.

(57) ABSTRACT

A support device for a vehicle seat includes a bag body. The bag body includes a bag body assembly including at least a first bag body unit and a second bag body unit that are combined with each other. The first bag body unit is disposed to form at least a support surface facing the seated occupant when the first bag body unit is expanded, and the second bag body unit is disposed to press the support surface toward the seated occupant when the second bag body unit is expanded. The first and second bag body units are simultaneously supplied with air and expanded, and a surface of the second bag body unit that faces the seated occupant in an expanded state is smaller than the support surface of the first bag body unit that faces the seated occupant in an expanded state.

6 Claims, 7 Drawing Sheets

(56) References Cited

U.S. PATENT DOCUMENTS 9,211,824 B2 * 12/2015 Arant ..................... B60N 2/62
2014/0167465 A1    6/2014 Sakata et al.

FOREIGN PATENT DOCUMENTS

| CN | 103863165 A | 6/2014 |
|----|-------------|--------|
| DE | 4106862 A1 | 9/1992 |
| JP | S61-7344 | 1/1986 |
| JP | S61-11359 | 1/1986 |
| JP | S62-101216 | 5/1987 |
| JP | 2004-081709 | 3/2004 |
| JP | 2008-143363 | 6/2008 |
| JP | 2009-523513 | 6/2009 |
| JP | 2012-045131 | 3/2012 |

OTHER PUBLICATIONS

Office Action issued in Japan Counterpart Patent Appl. No. 2015-106621, dated Oct. 9, 2018, along with an English translation thereof.

* cited by examiner

SUPPORT DEVICE FOR VEHICLE SEAT

INCORPORATION BY REFERENCE

The disclosure of Japanese Patent Application No. 2015-106621 filed on May 26, 2015 including the specification, drawings and abstract is incorporated herein by reference in its entirety.

BACKGROUND OF THE INVENTION

1. Field of the Invention

The invention relates to a seat that is installed in a vehicle such as an automobile, an aircraft, a vessel, or a train, and in particular to a support device such as a lumbar support.

2. Description of Related Art

A lumbar support that is operated by expansion and contraction of an airbag is described in Published Japanese Translation of PCT application No. 2009-523513 (JP 2009-523513 A). An air pump is used to expand and contract the airbag in the lumbar support.

However, a certain period of time is required to operate the air pump, to supply air to the airbag, and to expand the airbag, and thus, it takes time to operate the lumbar support. Although the size of the air pump needs to be increased in order to quickly operate the lumbar support, it is difficult to increase the size of the air pump due to an installation space in many cases. In other words, while the lumbar support device including the airbag is required to be operated at a high operation speed, there is a limitation to the operation speed due to restriction on the size of the air pump.

SUMMARY OF THE INVENTION

The invention provides a support device, such as a lumbar support, which includes an airbag that is expanded and contracted to adjust a supporting state for a seated occupant, and in which a bag that ensures a sufficient expansion height and a bag that ensures a sufficient expansion area are combined to reduce an air amount required to operate the airbag and to increase an operation speed without increasing the size of an air pump.

An aspect of the invention relates to a support device for a vehicle seat. The support device includes a bag body disposed in a seat for an occupant, and configured to face the occupant seated on the seat. A desired portion of a body of the seated occupant is supported when the bag body is supplied with air and is expanded. The bag body includes a bag body assembly including at least a first bag body unit and a second bag body unit that are combined with each other. The first bag body unit is disposed to form at least a support surface that faces the seated occupant when the first bag body unit is expanded, and the second bag body unit is disposed to contact a side of the first bag body unit and to press the support surface of the first bag body unit toward the seated occupant when the second bag body unit is expanded, the side of the first bag body unit being positioned on an opposite side of the support surface from the seated occupant. The first and second bag body units are simultaneously supplied with air and expanded, and a surface of the second bag body unit that faces the seated occupant in an expanded state is smaller than the support surface of the first bag body unit that faces the seated occupant in an expanded state.

In the above configuration, the first bag body unit and the second bag body unit may be integrated or may be separate bodies. In addition, the bag body assembly may include two or more bag body units that are combined.

In the above configuration, when the first bag body unit and the second bag body unit are simultaneously expanded, the occupant is supported by the first bag body unit in which a relatively large area facing the seated occupant is secured, and the first bag body unit is pressed toward the occupant to a required extent by the second bag body unit that has a relatively small area. Accordingly, as compared to a case where the support device is constituted by a bag body composed of one bag body unit, the bag body (the bag body assembly) can be expanded to provide required support for the occupant with the use of a small air amount, because the surface size (surface area) of the second bag body unit is made small. Thus, the air amount required to operate the airbag can be reduced. Therefore, the operation speed of the support device can be increased without increasing the size of the air pump.

In the above aspect, in the first bag body unit, members that constitute the bag body and face each other in a direction toward the seated occupant may be connected to each other such that separation of the members from each other is restricted.

In the above configuration, a connecting member that restricts separation of the members from each other may directly connect the members to each other or may connect the members to each other via another connecting member. In addition, a connecting site(s) may be positioned in the entire support surface of the first bag body unit that faces the seated occupant or may be positioned in a part of the support surface.

In the above configuration, expansion of the first bag body unit in the direction toward the seated occupant is restricted by connecting the bag body constituent members in the first bag body unit. Accordingly, the sufficiently large support surface facing the seated occupant can be secured while the air amount required to expand the first bag body unit is reduced. Accordingly, when the support surface facing the seated occupant is formed by the first bag body unit, an air amount required to operate the first bag body unit can be reduced. Therefore, the operation speed of the support device can be increased without increasing the size of the air pump.

In the above aspect, the first bag body unit may be divided into a first region and a second region along the support surface, and a thickness of the second region in a direction toward the seated occupant may be larger than a thickness of the first region in the direction toward the seated occupant when the first bag body unit is in the expanded state; and the second bag body unit in the expanded state may contact the second region of the first bag body unit.

In the above configuration, in order to produce a difference in thickness between both of the regions, separation of members constituting the first region may be restricted, or the size of the first region and the size of the second region may be made different from each other.

In the above configuration, since the first region is provided in the first bag body unit, the air amount required for expansion is reduced, while the sufficiently large support surface facing the seated occupant is secured. Meanwhile, the second region is provided in a part of the first bag body unit, and the thickness of the second region in the direction toward the seated occupant is larger than the thickness of the first region in the direction toward the seated occupant. In addition, the second bag body unit is caused to contact the second region, and thus the relatively large support surface can be expanded toward the seated occupant due to combination of the second region of the first bag body unit and the second bag body unit. Therefore, an expansion height can be efficiently secured with the use of a small amount of air.

In the above aspect, the first and second bag body units may be coupled to each other by a coupling portion such that the first and second bag body units are integrated; and the first and second bag body units may be folded onto each other at the coupling portion serving as a boundary such that the first and second bag body units overlap each other in a direction toward the seated occupant.

In the above configuration, the first and second bag body units are integrated via the coupling portion, and thus productivity of the bag body assembly can be increased.

In the above aspect, the coupling portion may be provided with a communication passage that provides communication between the first bag body unit and the second bag body unit; and air that is supplied to one of the first and second bag body units may be supplied to the other of the first and second bag body units via the communication passage.

In the above configuration, because communication is provided between the first bag body unit and the second bag body unit by the communication passage, air is supplied to and discharged from the first bag body unit and the second bag body unit through one supply-discharge passage, and thus a configuration of the supply-discharge passage can be simplified. Furthermore, because the communication passage is provided in the coupling portion that couples the bag body units, the communication passage and the coupling portion do not need to be provided separately from each other. Thus, the overall configuration of the bag body units can be simplified.

In the above aspect, the first and second bag body units, the coupling portion, and the communication passage may be integrally formed by joining two sheet members; the two sheet members may be joined along a joint line that extends along a boundary line that defines the first and second bag body units and the communication passage; and a groove may be provided on at least one of opposed wall surfaces of the two sheet members, the opposed wall surfaces constituting the coupling portion and the communication passage, and the communication passage may be secured by the groove when the opposed wall surfaces of the two sheet members are brought into contact with each other.

In the above configuration, a method for joining the two sheet members may be any of heat welding, adhesion using an adhesive, stitching using stitch thread, and the like.

In the above configuration, because the bag body units, the coupling portion, and the communication passage are integrally formed by joining the two sheet members, productivity of the bag body can be increased. In addition, the communication passage is formed by the groove on the wall surface of the sheet member. Thus, in the case where the opposed wall surfaces of the two sheet members are brought into contact with each other when the coupling portion is folded, the communication passage is secured. Thus, the operation of the bag body can be stabilized.

In the above aspect, a plurality of the bag body assemblies may be provided, and the bag body assemblies may be arranged such that the first regions of the first bag body units of the bag body assemblies overlap each other in the direction toward the seated occupant; the second regions of the first bag body units may be arranged to face each other along the support surface facing the seated occupant such that the first regions overlapping each other are positioned between the second regions; and each of the bag body assemblies may be selectively expanded.

In the above configuration, the two bag body assemblies are combined basically, and the two bag body assemblies may be arranged in at least any one of front-rear, right-left, and up-down directions with respect to the direction toward the seated occupant. In addition, with regard to a direction in which the two bag body assemblies are combined, a facing direction, in which the second regions of the first bag body units face each other with the first regions being positioned therebetween, may be any one of the up-down, right-left, and oblique directions (in other words, the second regions of the first bag body units may face each other with the first regions being positioned therebetween in any one of the up-down, right-left, and oblique directions).

In the above configuration, the second regions of the first bag body units with large expansion heights are arranged on respective sides of the first regions overlapping each other. In other words, the first regions overlapping each other are positioned between the second regions of the first bag body units. Accordingly, when each of the bag body assemblies is selectively expanded, a top position in the expansion height of the bag body facing the seated occupant is clearly changed. Thus, a support position for the seated occupant can be clearly changed by supplying and discharging air to and from each of the bag body assemblies.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
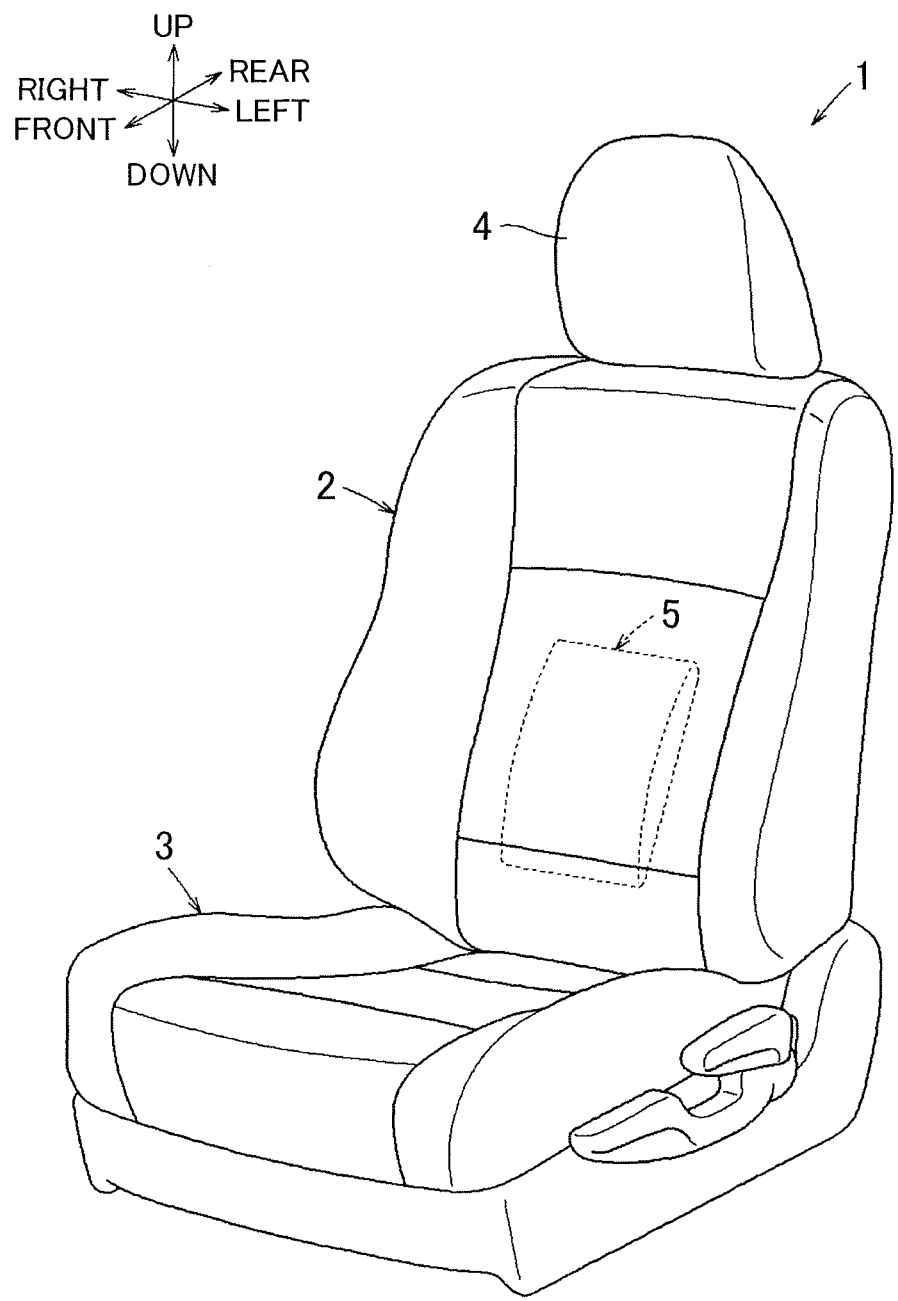
FIG. 1 is a perspective view of a vehicle seat to which an embodiment of the invention is applied.
Figure 2:
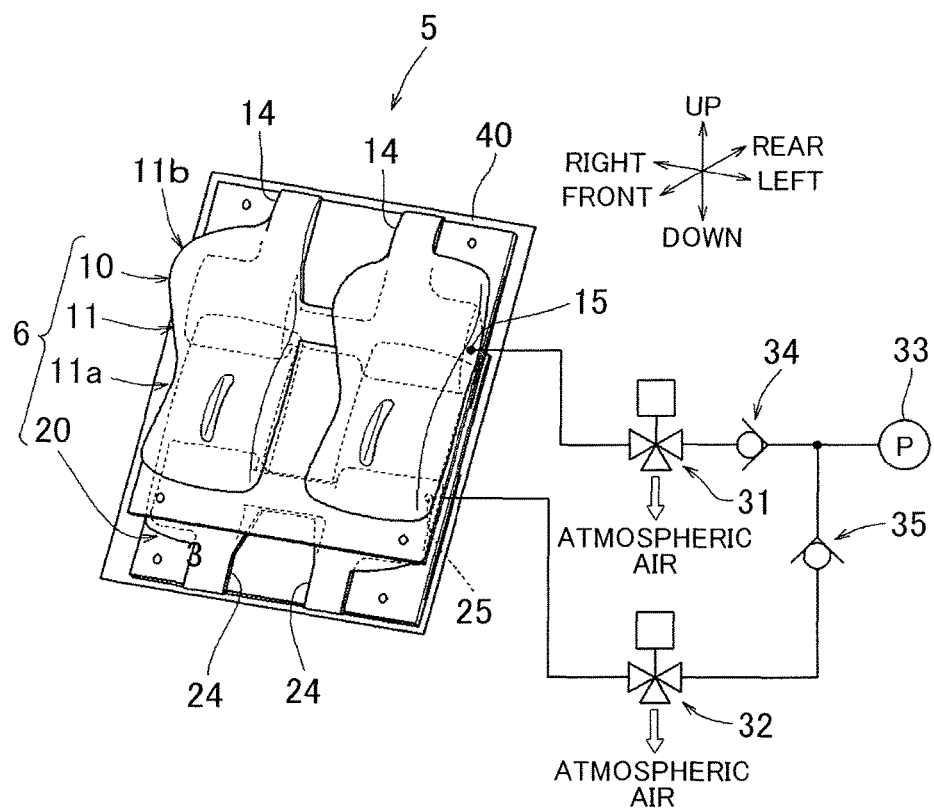
FIG. 2 is a system configuration diagram of the embodiment.

FIGS. 1, 2 show an embodiment of the invention. In the embodiment, a lumbar support 5 is applied, as a support device, to an automobile seat (a vehicle seat) 1 (hereinafter simply referred to as the seat 1). In each of the drawings, arrows indicate directions in a state where the seat is installed in an automobile. In the following description, the description on the directions is made using the directions as references.

FIG. 1 shows an overall configuration of the seat 1, and the seat 1 includes a seatback 2 that constitutes a backrest, and a seat cushion 3 that constitutes a seating portion, the seatback 2 being combined with seat cushion 3. A headrest 4 that supports a head of a seated occupant from behind is provided on top of the seatback 2. The lumbar support 5 is provided so as to be held between a back frame (not shown) and a back pad (not shown) of the seatback 2, and so as to correspond to a lumbar part (lower back part) of the seated occupant.

FIG. 2 shows a detailed configuration of the lumbar support 5. The lumbar support 5 includes a bag body 6 facing the seated occupant. When the bag body 6 is expanded (inflated) by supplying air to the bag body 6, the lumbar support 5 supports the lumbar part of the seated occupant from behind. The bag body 6 includes a front-side bag body assembly 10 that is near the seated occupant, and a rear-side bag body assembly 20 that is far from the seated occupant, the front-side bag body assembly 10 being combined with the rear-side bag body assembly 20. The front-side bag body assembly 10 and the rear-side bag body assembly 20 are supported by a support plate 40, and the support plate 40 is fixed to the back frame (not shown) of the seatback 2.

Figure 3:
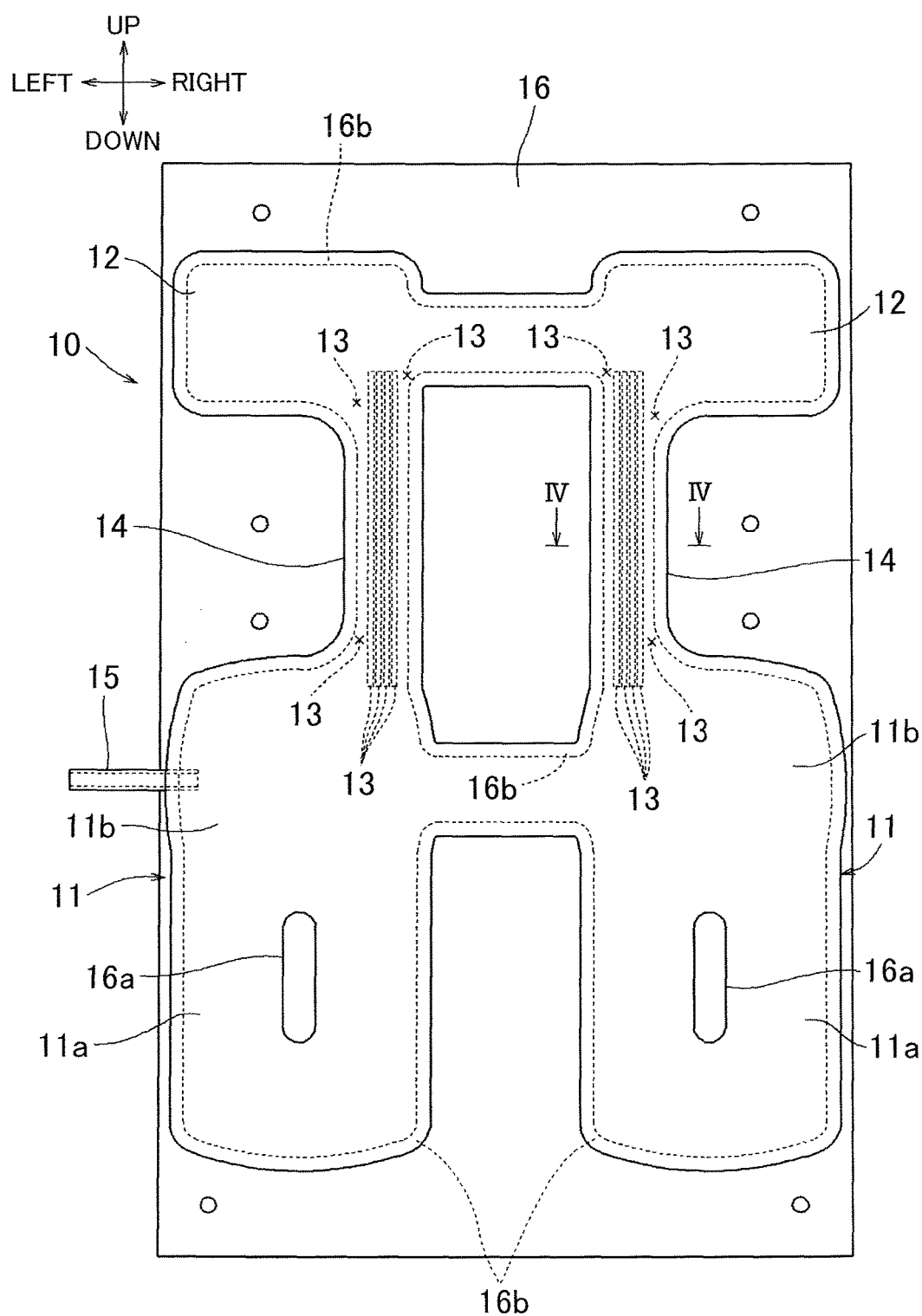
FIG. 3 is a front view of a bag body assembly in the embodiment.

FIG. 3 shows a detailed configuration of the front-side bag body assembly 10. The front-side bag body assembly 10 is constituted by two sheet members 16, 17 each of which is made of a thermoplastic polyurethane sheet in a substantially quadrangular shape. The sheet members 16, 17 are placed over each other such that surfaces of the sheet members 16, 17 face each other. In addition, peripheries of the two sheet members 16, 17 are fixed by heat welding. Thus, two bag bodies and a communication passage 13, through which air flows between the bag bodies, are formed. A first bag body unit 11 and a second bag body unit 12 constitute independent bag bodies, and are separated (defined) by a heat welding portion 16*b* formed by the heat welding such that communication is provided between the first bag body unit 11 and the second bag body unit 12 by the communication passage 13. Here, the first bag body unit 11 is formed to be relatively large on a lower side, the second bag body unit 12 is formed to be relatively small on an upper side, and a coupling portion 14 that constitutes the communication passage 13 is formed therebetween. Note that, in a region where the sheet members 16, 17 are placed over each other, a region other than the first bag body unit 11, the second bag body unit 12, and the coupling portion 14 may be removed and serve as a space except for a portion that is used to fix the front-side bag body assembly 10.

Figure 4:
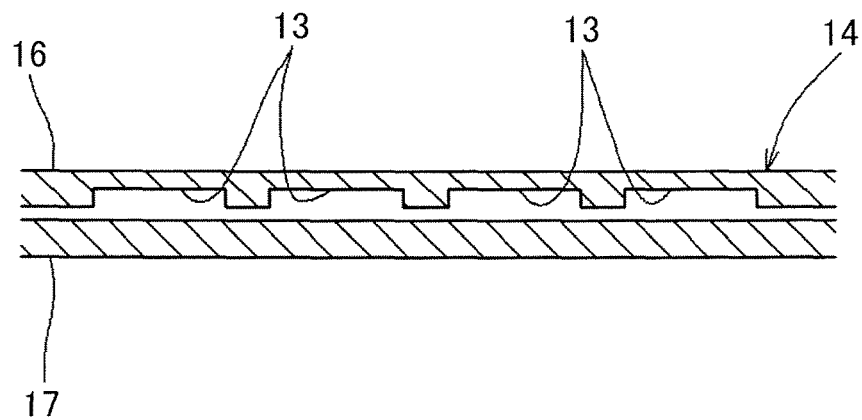
FIG. 4 is an enlarged sectional view taken along line IV-IV in FIG. 3.

As shown in FIG. 4, four (may be three or less or five or more) grooves are provided in a wall surface of the sheet member 16 that faces the sheet member 17 and that constitutes the coupling portion 14, and the communication passage 13 is formed also by the grooves.

As shown in FIG. 3, the first bag body unit 11, the second bag body unit 12, and the coupling portion 14 are each divided in a right-left direction, and a prescribed gap is provided between right and left portions thereof. The gap is provided so as to correspond to the backbone of the seated occupant. The gap prevents the backbone from being pressed by the bag body 6. However, in the first bag body unit 11 and the second bag body unit 12 each of which is divided into the right and left portions, the right and left portions communicate with each other such that the right and left portions are simultaneously expanded or contracted. In this case, each of the first bag body unit 11, the second bag body unit 12, and the coupling portion 14 is divided into the right and left portions, and has a bilaterally symmetrical shape with respect to a centerline in an up-down direction.

The first bag body unit 11 is divided into two regions in the up-down direction. A first region 11*a* on the lower side is configured such that a thickness thereof in a direction toward the seated occupant is relatively small in an expanded state. A second region 11*b* on the upper side is configured such that a thickness thereof in the direction toward the seated occupant is relatively large in the expanded state. Accordingly, in a center portion of the first region 11*a*, the sheet members 16, 17 that are constituent elements of the bag body are connected by heat welding, that is, the sheet members 16, 17 are connected by a connecting portion 16*a* formed by heat welding such that separation of the sheet members 16, 17 from each other is restricted. As described above, the thickness of the first region 11*a* is relatively small. Accordingly, while a sufficiently large support surface facing the seated occupant is provided by the first region 11*a* and the second region 11*b* in the first bag body unit 11, an operation speed of the first bag body unit 11 is increased by reducing an air amount required to expand the first region 11*a*.

As described above, the first bag body unit 11 is divided into the first region 11*a* and the second region 11*b*. As a result, when the first bag body unit 11 and the second bag body unit 12 are expanded, the thickness in the direction toward the seated occupant decreases in the order of the second region 11*b*, the first region 11*a*, and the second bag body unit 12. That is, when the first bag body unit 11 and the second bag body unit 12 are expanded, the second region 11*b* has the largest thickness in the direction toward the seated occupant, and the second bag body unit 12 has the smallest thickness in the direction toward the seated occupant, among the second region 11*b*, the first region 11*a* and the second bag body unit 12.

Here, a supply-discharge pipe 15 is connected to the second region 11*b* of the first bag body unit 11 such that air from the outside is supplied thereto or air is discharged therefrom. In addition, the supply or discharge of air through the supply-discharge pipe 15 is simultaneously performed for the second bag body unit 12 via the communication passage 13 (i.e., when air is supplied to or discharged from the first bag body unit 11 through the supply-discharge pipe 15, air is supplied to or discharged from the second bag body unit 12 at the same time through the supply-discharge pipe 15). Note that a connected position of the supply-discharge pipe 15 may be a side of the first region 11*a* of the first bag body unit 11 or a side of the second bag body unit 12. The second bag body unit 12 is supported by the support plate 40. Accordingly, in the case where the supply-discharge pipe 15 is connected to the second bag body unit 12, the connected position of the supply-discharge pipe 15 hardly moves even when the first bag body unit 11 and the second bag body unit 12 are expanded or contracted. Thus, it is possible to reduce the possibility that fatigue deterioration may occur in the connected portion of the supply-discharge pipe 15 due to movement of the connected portion.

Figure 5:
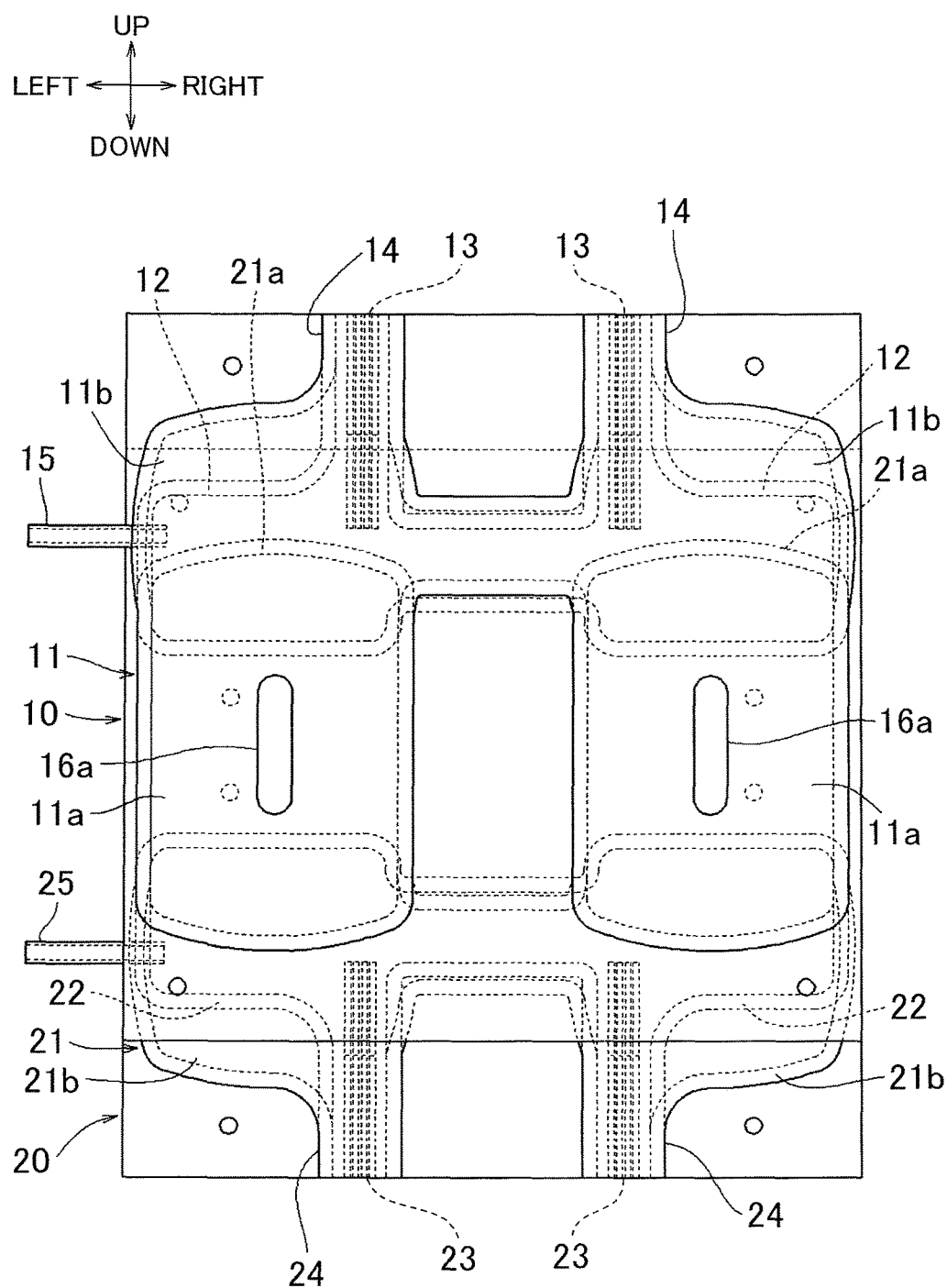
FIG. 5 is a front view illustrating a state where two bag body assemblies are combined in the embodiment.
Figure 6:
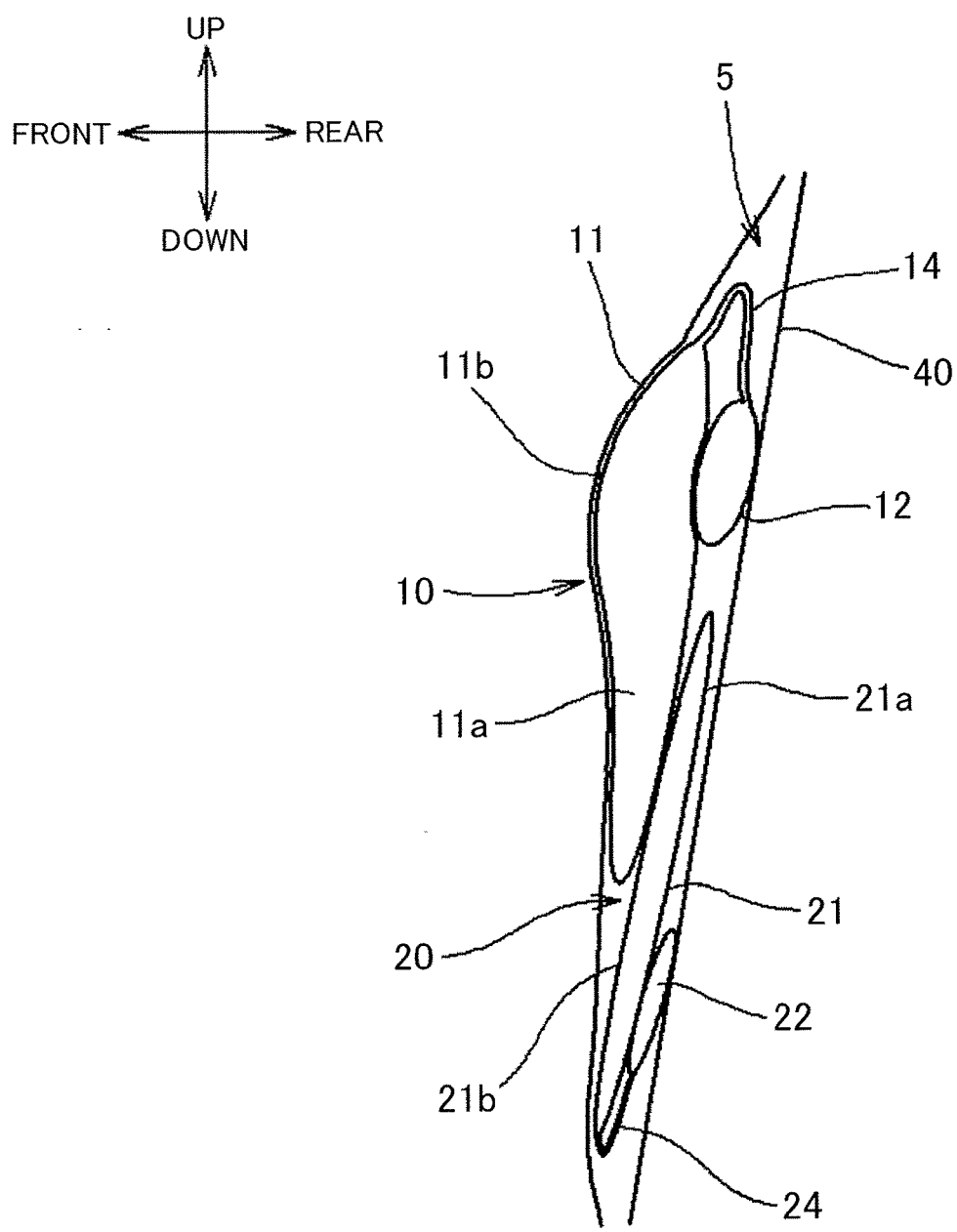
FIG. 6 is a side view illustrating the state where the two bag body assemblies are combined in the embodiment and illustrating a state where a front-side bag body assembly is expanded and a rear-side bag body assembly is contracted.

In the lumbar support 5 of the embodiment, as shown in FIGS. 2, 5 to 7, the front-side bag body assembly 10 is folded in the front-rear direction at the coupling portion 14 serving as a boundary, and the second bag body unit 12 is disposed on a rear side of the second region 11*b* of the first bag body unit 11 (in other words, the second bag body unit 12 is disposed behind the second region 11*b* of the first bag body unit 11). In this case, as shown in FIG. 6, a position at which the second bag body unit 12 overlaps the second region 11*b* of the first bag body unit 11 corresponds to center positions of expansion in the first bag body unit 11 and the second bag body unit 12 at a time when the first bag body unit 11 and the second bag body unit 12 are expanded.

In addition, the rear-side bag body assembly 20 that has the same structure as the structure of the front-side bag body assembly 10 is combined with the front-side bag body assembly 10. The rear-side bag body assembly 20 is combined with the front-side bag body assembly 10 such that the rear-side bag body assembly 20 is vertically reversed with respect to the front-side bag body assembly 10. The rear-side bag body assembly 20 is disposed such that a first region 21a of a first bag body unit 21 in the rear-side bag body assembly 20 overlaps a rear side of the first region 11a of the first bag body unit 11 in the front-side bag body assembly 10.

Figure 7:
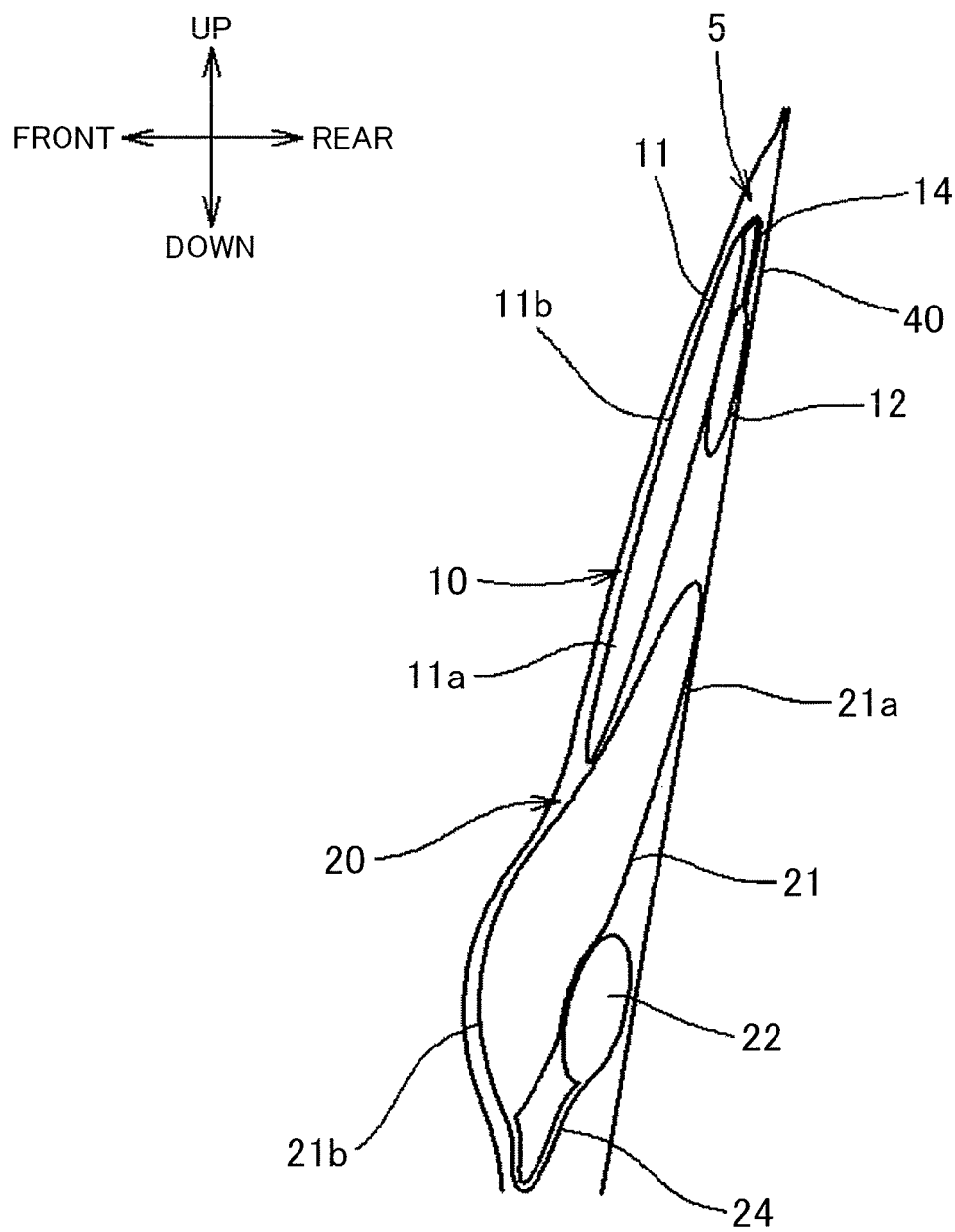
FIG. 7 is a side view illustrating the state where the two bag body assemblies are combined in the embodiment and illustrating a state where the front-side bag body assembly is contracted and the rear-side bag body assembly is expanded.

Note that FIGS. 2, 6 show a state where the front-side bag body assembly 10 is expanded and the rear-side bag body assembly 20 is contracted, FIG. 7 shows a state where the front-side bag body assembly 10 is contracted and the rear-side bag body assembly 20 is expanded, and FIG. 5 shows a state where both of the front-side bag body assembly 10 and the rear-side bag body assembly 20 are contracted.

As shown in FIG. 6, when air is supplied to the front-side bag body assembly 10 and both of the first bag body unit 11 and the second bag body unit 12 are expanded, the second bag body unit 12 can firmly press the lumbar part of the seated occupant by pressing the second region 11b of the first bag body unit 11 from the rear side. A thickness of the front-side bag body assembly 10 in the direction toward the seated occupant at this time is a sum of the thickness of the second bag body unit 12 and the thickness of the second region 11b of the first bag body unit 11. In addition, the position at which the second bag body unit 12 and the second region 11b of the first bag body unit 11 overlap each other corresponds to a top pressing position with respect to the lumbar part of the seated occupant (i.e., a top position (vertex position) of a pressing portion that presses the lumbar part of the seated occupant).

As shown in FIG. 7, when air is supplied to the rear-side bag body assembly 20 and both of the first bag body unit 21 and a second bag body unit 22 are expanded, the second bag body unit 22 can firmly press the lumbar part of the seated occupant by pressing a second region 21b of the first bag body unit 21 from the rear side. A thickness of the rear-side bag body assembly 20 in the direction toward the seated occupant at this time is a sum of a thickness of the second bag body unit 22 and a thickness of the second region 21b of the first bag body unit 21. In addition, a position at which the second bag body unit 22 and the second region 21b of the first bag body unit 21 overlap each other corresponds to a top pressing position with respect to the lumbar part of the seated occupant (i.e., a top position (vertex position) of a pressing portion that presses the lumbar part of the seated occupant). As apparent from a comparison between FIG. 6 and FIG. 7, the top position is a high position on the upper side in FIG. 6, whereas the top position is a low position on the lower side in FIG. 7.

As described above, the top position at which the lumbar part of the seated occupant is pressed firmly can be formed clearly. The second bag body units 12, 22 perform only a function of respectively pressing the second regions 11b, 21b of the first bag body units 11, 21, and the first bag body units 11, 21 perform a function of providing the sufficiently large support surface facing the seated occupant. Accordingly, the front-side bag body assembly 10 and the rear-side bag body assembly 20 as a whole can efficiently support the lumbar part of the seated occupant with the use of a small air amount. Thus, the operation speed of the lumbar support 5 can be increased without increasing a size of an air pump.

In addition, the second regions 11b, 21b of the first bag body units 11, 21, which have large expansion heights (i.e., which have large heights at the time of expansion), are arranged on respective sides of the first regions 11a, 21a that overlap each other. In other words, the first regions 11a, 21a overlapping each other are positioned between the second regions 11b, 21b. Accordingly, when each of the bag body assemblies 10, 20 is selectively expanded, the top position facing the seated occupant is clearly changed. Thus, a support position for the seated occupant can be clearly changed by the supply and discharge of air to and from each of the bag body assemblies 10, 20.

As shown in FIG. 2, the supply-discharge pipes 15, 25 for the front-side bag body assembly 10 and the rear-side bag body assembly 20 are connected to a pump 33 via a first switching valve 31 and a second switching valve 32, respectively. Each of the first and second switching valves 31, 32 is an electromagnetic valve (solenoid valve). Each of the first and second switching valves 31, 32 is in an air discharging state during energization, and is in an air supplying state where the switching valve communicates with the pump 33 during non-energization. In addition, the pump 33 generates compressed air when being energized. Accordingly, by switching between the energization and non-energization of each of the first and second switching valves 31, 32, each of the supply-discharge pipes 15, 25 is selectively switched between an air supplying state where the supply-discharge pipe communicates with the pump 33 and an air discharging state where the supply-discharge pipe communicates with an atmospheric air release port. Check valves 34, 35 are respectively interposed between the first and second switching valves 31, 32 and the pump 33. The check valves 34, 35 respectively permit flows of air from the pump 33 toward the first and second switching valves 31, 32 and inhibit flows of air in a reverse direction.

In the case where the first switching valve 31 is not energized and the pump 33 is energized to generate compressed air, the air from the pump 33 is supplied to the front-side bag body assembly 10 via the supply-discharge pipe 15. As a result, as shown in FIGS. 2, 6, the first bag body unit 11 and the second bag body unit 12 are expanded, and the lumbar part of the seated occupant is supported. In the case where the pump 33 is brought to the non-energized state from the energized state and the first switching valve 31 is maintained in the non-energized state, the air supplied to the front-side bag body assembly 10 is retained by the check valve 34, and the lumbar part of the seated occupant is continuously supported by the front-side bag body assembly 10.

Thereafter, in the case where the first switching valve 31 is brought to the energized state, the second switching valve 32 is switched from the energized state to the non-energized state, and the pump 33 is energized, air from the pump 33 is supplied to the rear-side bag body assembly 20 via the supply-discharge pipe 25. In addition, the air supplied to the front-side bag body assembly 10 is discharged via the supply-discharge pipe 15 and the first switching valve 31. As a result, as shown in FIG. 7, the first bag body unit 21 and the second bag body unit 22 of the rear-side bag body assembly 20 are expanded, and the first bag body unit 11 and the second bag body unit 12 of the front-side bag body assembly 10 are contracted. Accordingly, the lumbar support of the seated occupant is supported by the rear-side bag body assembly 20. In the case where the pump 33 is brought to the non-energized state from the energized state and the second switching valve 32 is maintained in the non-energized state, the air supplied to the rear-side bag body assembly 20 is retained by the check valve 35, and the lumbar part of the seated occupant is continuously supported by the rear-side bag body assembly 20.

In the embodiment, when the first bag body unit 11 or 21 and the second bag body unit 12 or 22 are simultaneously expanded, the occupant is supported by the first bag body unit 11 or 21 in which a relatively large area facing the seated occupant is secured, and the first bag body unit 11 or 21 is pressed toward the occupant to a required extent by the second bag body unit 12 or 22 that has a relatively small area. Accordingly, as compared to a case where the lumbar support 5 is constituted by a bag body composed of one bag body unit, the bag body (i.e., each bag body assembly) can be expanded to provide the required support for the occupant with the use of a small air amount, because the surface size (surface area) of each of the second bag body units 12, 22 is made small. Thus, the air amount required to operate the airbag can be reduced. Therefore, the operation speed of the lumbar support 5 can be increased without increasing the size of the pump 33.

In addition, because the first and second bag body units 11, 12 are integrated by the coupling portion 14, and the first and second bag body units 21, 22 are integrated by the coupling portion 24, productivity of each of the front-side and rear-side bag body assemblies 10, 20 can be increased.

Furthermore, because communication is provided between the first and second bag body units 11, 12 by the communication passage 13, and communication is provided between the first and second bag body units 21, 22 by the communication passage 23, air is supplied to and discharged from the first and second bag body units 11, 12 through one supply-discharge passage, and air is supplied to and discharged from the first and second bag body units 21, 22 through one supply-discharge passage. Thus, a configuration of each supply-discharge passage can be simplified. Furthermore, the communication passage 13 is provided in the coupling portion 14 that connects the bag body units 11, 12, and the communication passage 23 is provided in the coupling portion 24 that connects the bag body units 21, 22. Therefore, the communication passage 13 and the coupling portion 14 do not need to be provided separately from each other, and the communication passage 23 and the coupling portion 24 do not need to be provided separately from each other. Thus, the overall configuration of the bag body units 11, 12, and the overall configuration of the bag body units 21, 22 can be simplified.

Moreover, the bag body units 11, 12, the coupling portion 14, and the communication passage 13 are integrally formed by joining the two sheet members 16, 17, and the bag body units 21, 22, the coupling portion 24, and the communication passage 23 are integrally formed by joining the two sheet members 16, 17. Therefore, the productivity of each of the front-side and rear-side bag body assemblies 10, 20 can be increased. In addition, each of the communication passages 13, 23 is formed by the grooves on the wall surface of the sheet member 16. Therefore, even in the case where the opposed surfaces (opposed wall surfaces) of the two sheet members 16, 17 are brought into contact with each other when the coupling portions 14, 24 are folded, the communication passages 13, 23 are secured. Thus, operations of the front-side and rear-side bag body assemblies 10, 20 can be stabilized.

The particular embodiment has been described. However, the invention is not limited to exterior appearance and the configuration in the embodiment, and various modifications, additions, and deletions may be made to the embodiment without departing from the scope of the invention. For example, an example in which the invention is applied to the lumbar support as the support device has been described in the above embodiment. In addition, the invention may be applied to, for example, a so-called shoulder support that can adjust a support position for a shoulder portion of the seated occupant, a so-called thigh support that increases the height of the side of the seat cushion when necessary in order to suppress displacement of a body of the seated occupant toward the side of the seat due to a lateral load, and a cushion-length varying device that causes a distal end of the seat cushion to project toward the front side in accordance with the length of legs of the seated occupant. In addition, an example in which the invention is applied to the automobile seat has been described in the above embodiment. However, the invention may be applied to seats that are installed in an aircraft, a vessel, a train, and the like.

What is claimed is:

1. A support device for a vehicle seat, the support device comprising a bag body disposed in a seat for an occupant, and configured to face the occupant seated on the seat, wherein:
    a desired portion of a body of the seated occupant is supported when the bag body is supplied with air and is expanded;
    the bag body includes a bag body assembly including at least a first bag body unit and a second bag body unit that are combined with each other;
    the first bag body unit is disposed to form at least a support surface that faces the seated occupant when the first bag body unit is expanded, and the second bag body unit is disposed to contact a side of the first bag body unit and to press the support surface of the first bag body unit toward the seated occupant when the second bag body unit is expanded, the side of the first bag body unit being positioned on an opposite side of the support surface from the seated occupant;
    the first and second bag body units are simultaneously supplied with air and expanded, and a surface of the second bag body unit that faces the seated occupant in an expanded state is smaller than the support surface of the first bag body unit that faces the seated occupant in an expanded state;
    the first and second bag body units are coupled to each other by a coupling portion such that the first and second bag body units are integrated; and
    the first and second bag body units are folded onto each other at the coupling portion serving as a boundary such that the first and second bag body units overlap each other in a direction toward the seated occupant.

2. The support device according to claim 1, wherein the bag body comprises members, wherein in the first bag body unit, the members that constitute the bag body and face each other in a direction toward the seated occupant are connected to each other such that separation of the members from each other is restricted.

3. The support device according to claim 1, wherein:
    the first bag body unit is divided into a first region and a second region along the support surface, and a thickness of the second region in a direction toward the seated occupant is larger than a thickness of the first region in the direction toward the seated occupant when the first bag body unit is in the expanded state; and
    the second bag body unit in the expanded state contacts the second region of the first bag body unit.

4. The support device according to claim 3, wherein:
a plurality of the bag body assemblies is provided, and the bag body assemblies are arranged such that the first regions of the first bag body units of the bag body assemblies overlap each other in the direction toward the seated occupant;
the second regions of the first bag body units are arranged to face each other along the support surface facing the seated occupant such that the first regions overlapping each other are positioned between the second regions; and
each of the bag body assemblies is selectively expanded.

5. The support device according to claim 1, wherein:
the coupling portion is provided with a communication passage that provides communication between the first bag body unit and the second bag body unit; and
air that is supplied to one of the first and second bag body units is supplied to the other of the first and second bag body units via the communication passage.

6. The support device according to claim 5, wherein:
the first and second bag body units, the coupling portion, and the communication passage are integrally formed by joining two sheet members;
the two sheet members are joined along a joint line that extends along a boundary line that defines the first and second bag body units and the communication passage; and
a groove is provided on at least one of opposed wall surfaces of the two sheet members, the opposed wall surfaces constituting the coupling portion and the communication passage, and the communication passage is secured by the groove when the opposed wall surfaces of the two sheet members are brought into contact with each other.

* * * * *